H. W. STOLLENWERK.
SPLIT RIM EXPANDING TOOL.
APPLICATION FILED DEC. 18, 1918.

1,306,200.

Patented June 10, 1919.

WITNESS
T. P. Britt

INVENTOR
Henry W. Stollenwerk
BY Young & Young
ATTORNEY

UNITED STATES PATENT OFFICE.

HENRY W. STOLLENWERK, OF MILWAUKEE, WISCONSIN.

SPLIT-RIM EXPANDING-TOOL.

1,306,200.  Specification of Letters Patent.  Patented June 10, 1919.

Application filed December 18, 1918. Serial No. 267,352.

*To all whom it may concern:*

Be it known that I, HENRY W. STOLLENWERK, a citizen of the United States, and resident of Milwaukee, in the county of Milwaukee and State of Wisconsin, have invented certain new and useful Improvements in Split-Rim Expanding-Tools; and I do hereby declare that the following is a full, clear, and exact description thereof.

My invention relates to new and useful improvements in tools for expanding the split rims associated with pneumatic vehicle tires.

It is in general the object of my invention to simplify and otherwise improve the structure and to increase the efficiency of such devices, as well as to increase the ease and rapidity of manipulation of such devices.

A more detailed object resides in the provision of an expanding device which will engage the rim for expanding action thereon without the necessity of first clamping any portions of the device thereto.

A still further object resides in the provision of such a device which will engage various portions of the rim so as to procure a maximum distribution of the expanding force of the device.

With the above and other objects and advantages in view, which will be apparent as the description proceeds, my invention resides in the novel features of construction, combination and arrangement of parts as hereinafter more particularly described and defined by the appended claims.

Figure 1:
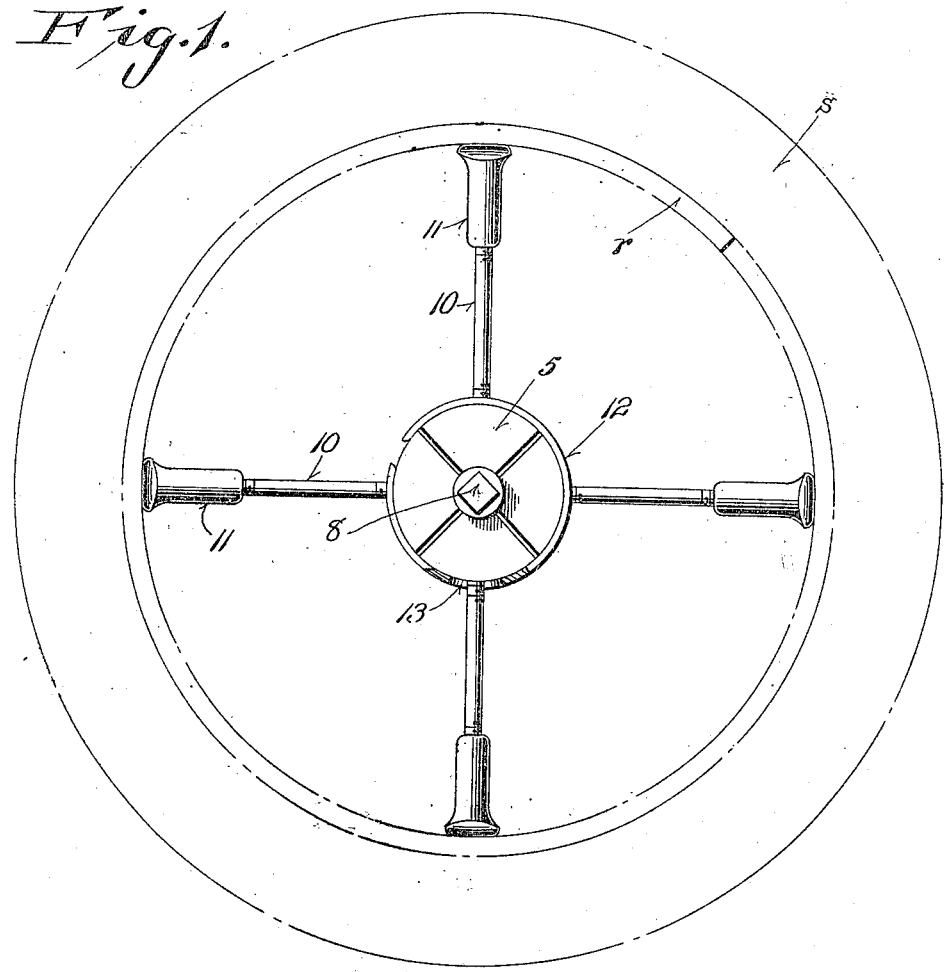
Figure 1 is a side elevational view of my improved expanding device mounted within a conventionally shown rim.
Figure 2:
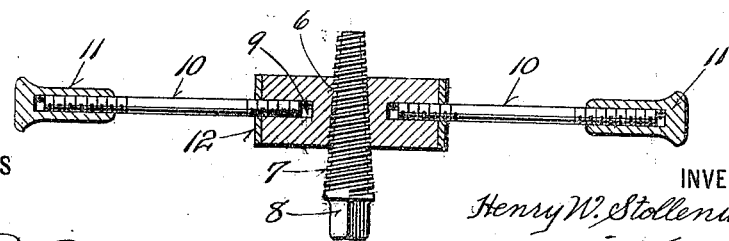
Fig. 2 is a sectional view taken centrally through the device.

Referring now more particularly to the accompanying drawings, my improved device includes a head of general cylindrical shape, and formed of a plurality of, in the present instance four sector-shaped blocks 5 provided with transversely arcuate grooves in their inner portions co-acting to form a tapered bore 6 through the center of the head member, the surfaces of said grooves being provided with series of thread sections co-acting to form continuous threading engageable with the threads of a tapered spreading screw 7 having one end squared to provide a wrench head 8. Each of the blocks 5 is provided with a recess 9 extending from its outer face radially of the head and threaded to receive a spreader rod 10 on the outer end of which is threaded the tubular shank of a rim engaging shoe 11. The blocks 5 are held in assembled relation and resiliently urged together to assume a true cylindrical shape of the head by a split band 12 disposed thereabout, which is provided with circumferentially elongated slots 13 receiving the spreader rods 10 and permitting relative movement of the rods with respect to the band.

In Fig. 1, a split rim *r* is shown in dotted outline, disposed within a tire shoe *s*, and in the operation of my device, said device is placed within the contracted rim, the normal lengths of the spreader rods being such that the outer faces of the shoes 11 loosely engage the inner periphery of the rim when the head is contracted. The screw 7 is then turned to expand the head and the spreader rods are thereby forced outwardly whereby a spreading action is exerted on the rim at each shoe, to thus conveniently expand the rim to its normal expanded position. The device is then removed by rotating the screw in a reverse direction to relieve the expanding pressure.

An exceedingly simple device has thus been provided which may be most readily applied to a split rim for expanding the same, and which will not mar or damage the rim in any manner. It is noted that the threaded engagement of the spreader rods 10 in the head blocks 5, and the threaded engagement of the shoes 11 on said rods 10, provides for adjustment of the tool to adapt it for rapid operation in conjunction with different sizes of split rims.

What is claimed is:

1. A split rim expanding tool comprising a plurality of sector-shaped blocks, a contractile split band disposed about said blocks, members extending radially from said blocks and engageable with the periphery of the split rim, and means for moving said blocks outwardly against the action of said split band.

2. A split rim expanding tool comprising a plurality of sector-shaped blocks, a contractile split band disposed about said blocks, and provided with circumferentially elongated slots, arms extending radially from the blocks and passed through said slots and engageable with the periphery of the rim, and means for moving said blocks outwardly against the action of said split band.

In testimony that I claim the foregoing I have hereunto set my hand at Milwaukee, in the county of Milwaukee and State of Wisconsin.

HENRY W. STOLLENWERK.